United States Patent
Rodrigo Cavalin et al.

(10) Patent No.: US 11,677,692 B2
(45) Date of Patent: Jun. 13, 2023

(54) CONVERSATIONAL SYSTEMS CONTENT RELATED TO EXTERNAL EVENTS

(71) Applicant: International Business Machines Corporation, Armonk, NY (US)

(72) Inventors: Paulo Rodrigo Cavalin, Rio de Janeiro (BR); Ana Paula Appel, Sao Paulo (BR); Renato Luiz de Freitas Cunha, Sao Paulo (BR); Bruno Silva, Sao Paulo (BR)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/475,555

(22) Filed: Sep. 15, 2021

(65) Prior Publication Data

US 2023/0084688 A1    Mar. 16, 2023

(51) Int. Cl.
| | |
|---|---|
| G06F 15/16 | (2006.01) |
| H04L 51/02 | (2022.01) |
| G06F 11/34 | (2006.01) |
| G06F 40/35 | (2020.01) |
| G06F 18/214 | (2023.01) |
| G06F 18/23213 | (2023.01) |

(52) U.S. Cl.
CPC ......... H04L 51/02 (2013.01); G06F 11/3476 (2013.01); G06F 18/214 (2023.01); G06F 18/23213 (2023.01); G06F 40/35 (2020.01)

(58) Field of Classification Search
CPC ...... H04L 51/02; G06F 40/35; G06F 11/3476; G06K 9/6223; G06K 9/6256
USPC ..................................................... 709/206
See application file for complete search history.

(56) References Cited

U.S. PATENT DOCUMENTS

| | | | |
|---|---|---|---|
| 9,548,050 B2 | 1/2017 | Gruber et al. | |
| 9,912,810 B2 | 3/2018 | Segre et al. | |
| 10,134,391 B2 | 11/2018 | Erhart et al. | |
| 10,530,923 B1 | 1/2020 | Leeds et al. | |
| 2014/0279050 A1 | 9/2014 | Makar et al. | |
| 2016/0217784 A1 | 7/2016 | Gelfenbeyn et al. | |
| 2017/0186419 A1* | 6/2017 | Erhart | G10L 15/06 |

(Continued)

FOREIGN PATENT DOCUMENTS

| | | |
|---|---|---|
| CN | 110472021 A | 11/2019 |
| EP | 3195307 B1 | 7/2017 |
| KR | 20190101492 A | 8/2019 |
| TW | 202009749 A | 3/2020 |

OTHER PUBLICATIONS

Joigneau, Axel. "Utterances classifier for chatbots' intents". 2018. pp. 1-58. (Year: 2018).*

(Continued)

*Primary Examiner* — Imad Hussain
(74) *Attorney, Agent, or Firm* — Scully, Scott, Murphy & Presser, P.C.; Anthony Mauricio Pallone

(57) ABSTRACT

Chatbot logs can be received. The chatbot logs can be clustered or classified into clusters of potential intents. Trending topics can be detected by analyzing at least social media content. Semantic similarities between the potential intents and the trending topics can be computed. Based on the computed semantic similarities, at least one of the potential intents to at least one of the trending topics can be correlated. Training of the chatbot using the chatbot logs associated with the correlated potential intent can be triggered.

18 Claims, 11 Drawing Sheets

(56) References Cited

U.S. PATENT DOCUMENTS

| | | | |
|---|---|---|---|
| 2017/0250930 | A1 | 8/2017 | Ben-Itzhak |
| 2018/0075335 | A1 | 3/2018 | Braz et al. |
| 2018/0322155 | A1* | 11/2018 | Alonso .................. G06F 16/26 |
| 2019/0297039 | A1 | 9/2019 | Rodriguez et al. |
| 2019/0392285 | A1 | 12/2019 | Manaharlal Kakkad et al. |
| 2020/0143265 | A1 | 5/2020 | Jonnalagadda et al. |
| 2020/0234190 | A1* | 7/2020 | Beaver .................. G06N 3/006 |
| 2020/0342032 | A1 | 10/2020 | Subramaniam et al. |
| 2020/0357382 | A1 | 11/2020 | Ogawa et al. |
| 2020/0403944 | A1* | 12/2020 | Joshi ...................... G06F 9/547 |

OTHER PUBLICATIONS

Lee, Diana. "How we analyzed 200K messages to design a chatbot". Jan. 19, 2019. pp. 1-8. (Year: 2019).*

Chatterjee, Ajay and Sengupta, Shubhashis. "Intent Mining from past conversations for Conversational Agent". Dec. 2020. pp. 1-13. (Year: 2020).*

Althoff, T., et al., "Analysis and Forecasting of Trending Topics in Online Media Streams", https://arxiv.org/pdf/1405.7452.pdf, arXiv:1405.7452v2, Jun. 14, 2014, 10 pages.

Xu, A., et al., "A new chatbot for customer service on social media", Proceedings of the 2017 CHI Conference on Human Factors in Computing Systems, May 2017, pp. 3506-3510.

NIST, "NIST Cloud Computing Program", http://csrc.nist.gov/groups/SNS/cloud-computing/index.html, Created Dec. 1, 2016, Updated Oct. 6, 2017, 9 pages.

Office Action dated Apr. 7, 2023 received in Taiwan Patent Application Serial No. 111119371, 20 pages.

\* cited by examiner

CONVERSATIONAL SYSTEMS CONTENT RELATED TO EXTERNAL EVENTS

BACKGROUND

The present application relates generally to computers and computer applications, and more particularly to conversational system, chatbots, machine learning and natural language processing.

Computer implemented processes, for example, using artificial intelligence techniques, can be implemented to engage in a conversation with a user. A chatbot, for example, is an example computer application or process, which can carry on a live conversation or chat with a user, e.g., a human user. A chatbot can be developed to be able to intelligently carry on a conversation and provides answers to questions. For instance, a chatbot user may use a chatbot to perform a task, for example, answer a question. An intent represents a task, action or goal that a chatbot user desires to perform. A chatbot can be trained on the intent, to engage in a conversation with the chatbot user to perform that goal or task. Looking for intents to create training data can be a difficult task, and often viable intents can be missed.

BRIEF SUMMARY

The summary of the disclosure is given to aid understanding of a computer system and method of improving automated conversational systems, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A system, in an aspect, can include a hardware processor and a memory device coupled with the hardware processor. The hardware processor can be configured to receive chatbot logs including at least questions received by a chatbot conversing with a user. The hardware processor can also be configured to cluster the chatbot logs into clusters of potential intents. The hardware processor can also be configured to detect trending topics by analyzing at least social media content. The hardware processor can also be configured to compute semantic similarities between the potential intents and the trending topics. The hardware processor can also be configured to, based on the computed semantic similarities, correlate at least one of the potential intents to at least one of the trending topics. The hardware processor can also be configured to trigger training of the chatbot using the chatbot logs associated with the correlated potential intent.

A method, in an aspect, can include receiving chatbot logs including at least questions received by a chatbot conversing with a user. The method can also include clustering the chatbot logs into clusters of potential intents. The method can also include detecting trending topics by analyzing at least social media content. The method can also include computing semantic similarities between the potential intents and the trending topics. The method can also include, based on the computed semantic similarities, correlating at least one of the potential intents to at least one of the trending topics. The method can also include triggering training of the chatbot using the chatbot logs associated with the correlated potential intent.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
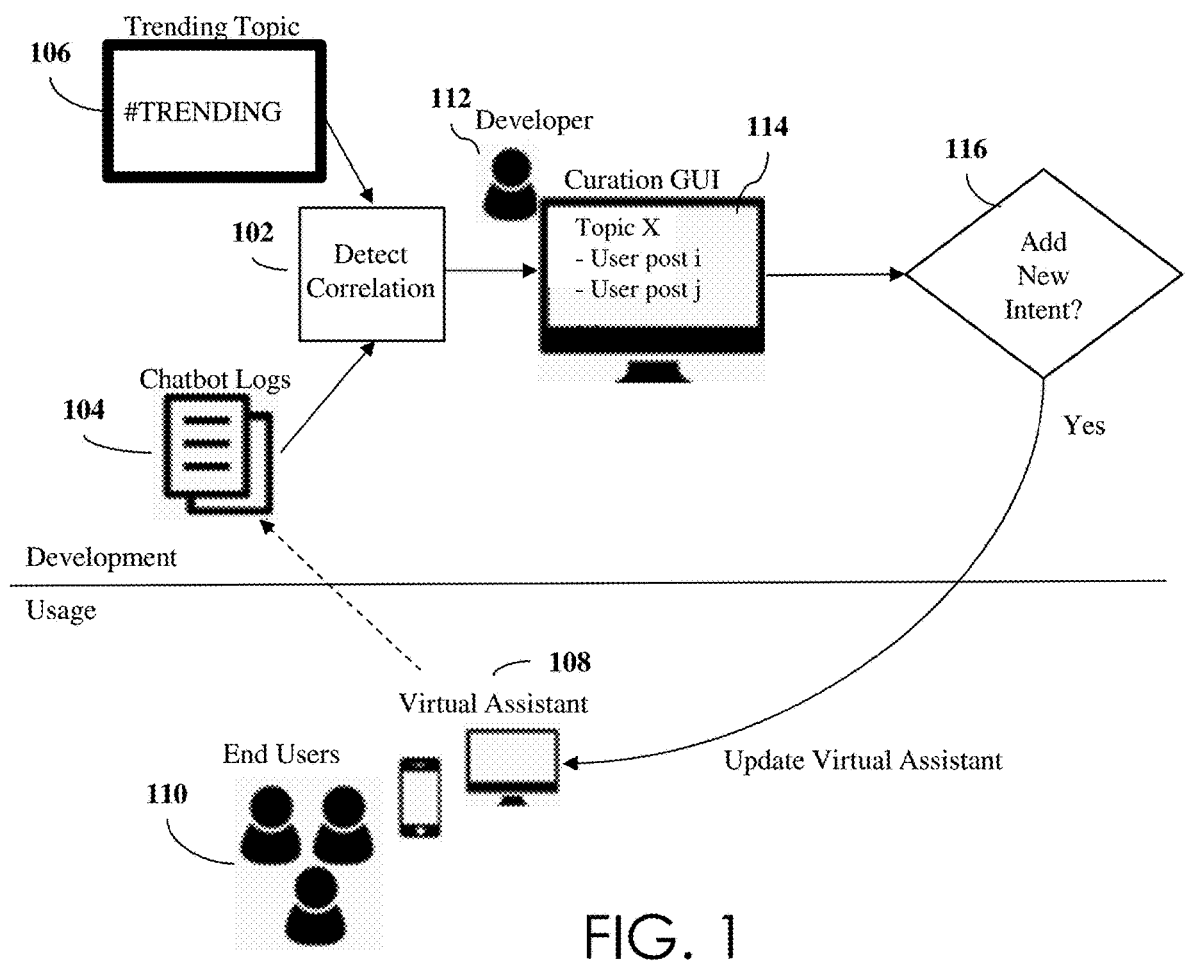
FIG. 1 is a diagram illustrating a system flow in an embodiment.

A system, method and technique are disclosed, which can automate and improve chatbots in conversing with a user. In an aspect, a system and/or method may provide for automatic creation of chatbot intents, e.g., by using the combination of media trending topics and aggregated questions from computer-user or chatbot interaction logs. For instance, automatic intents can be created based on the correlation of conversation logs with media trending topics. If, in the call logs, the increase of questions about some topics correlates with the growth of media appearance, the system and/or method may create automatic intents for preparing the chatbot to answer the new question or questions associated with those topics, for instance, before the new questions inundate the call logs. Such automation can speed up the process of creating new intents and incorporate external knowledge that may not be obvious in developing a domain-related chatbot.

A chatbot (also referred to as a bot) can be an automated computer process running on a computer, e.g., software, firmware, and/or programmed hardware, which can carry on a conversation with a human user or another automatic computer process. A chatbot can be programmed using artificial intelligence techniques such as machine learning (ML) and natural language processing (NLP). The conversation can be performed via text and/or speech. A chatbot can be an automated computer process that can interact with a user by carrying on a conversation such as answering a question, providing guidance or instructions for performing an act, and/or another.

A chatbot can be trained using one or more machine learning techniques using training data which can include intents. An intent represents a task, action or goal, for example, a goal that a chatbot user is trying to achieve using the chatbot, e.g., a goal that a chatbot user would like the chatbot to perform, such as answering a specific question. A chatbot can be trained to understand that intent (e.g., human intentions) in order to provide the result or information the user is looking for. Chatbot developers may create intents based on utterances (conversation logs) for a particular task. A large set of intents (e.g., tasks that a chatbot can handle) can make a chatbot more robust. Examples of intents can include, but are not limited, answering a question about certain health insurance, ordering food, making travel reservations, purchasing tickets, checking status, and/or others.

In one or more embodiments, a system and/or method may provide for chatbots or automated computer processes, which may be able to deal with an open-world context. For example, a user can ask any question, and the content of the chatbot (the intents) can be updated to cover the user questions, for example, to provide for more intelligent chatbots that can converse with a user, further enhancing the user experience. For instance, a dynamic environment can be provided, in which the intents of the chatbot are updated to cover user questions that become more common. Further, external events or news may trigger a log of questions that can be asked by the users. The update of the chatbot may be done dynamically and quickly, for example, to avoid harming user experience.

In an embodiment, a system in an aspect can help chatbot developers or subject matter experts, update chatbot's content, by detecting chatbot log posts related to external events. The system can provide or point out to the developer or SMEs which questions or messages, extracted from the chatbot logs, are related to a given event or external event. A developer may be triggered or prompted to inspect such messages, e.g., to determine whether to include an automatically created new intent and/or which messages to use as training examples. The system can also aid in compilations of texts that can be useful to create answering content. The system may accelerate the process of curating and updating chatbot content, by proposing new intents based on chatbot logs and external events.

FIG. 1 is a diagram illustrating a system flow in an embodiment. The components shown include computer-implemented components, for instance, implemented and/or run on one or more computer or hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

In an embodiment, a detect correlation component or module 102 handles the detection of chatbot logs 104, which are associated to trending topics 106 from the real world. A computer system or chatbot application running one or more chatbots may create or generate chatbot logs 104 based on conversations occurring between one or more chatbots (also referred to as a virtual assistant) 108 and one or more end users 110. The detect correlation component 102 finds chatbot logs 104, which are related to trending topics 106.

Responsive to finding a correlation of chatbot logs 104 to real-world trending topics 106, the correlated chatbot log and trending topic can be presented to a developer or an SME or another user 112, for example, on a curation graphical user interface (GUI) 114. In an aspect, an intent can be automatically discovered, for example, based on analyzing the correlated chatbot log and the trending topic. For instance, a common theme or subject (e.g., topic) can be discovered or identified, common to the chatbot log and the trending topic.

Via the GUI 114, an SME 112 or the like, may be able to visualize the possible new topics and associated chatbot log samples that can be used to create a new intent. The GUI 114 can allow a user, e.g., an SME 112, to revise the results and add a new intent. For example, as shown at 116, the SME 122 via the GUI 114 can decide to add the new intent detected by the module 102 and presented to the user via the GUI 114. If the new intent is to be added, the system can update the chatbot (also referred to as a virtual assistant) 108, for example, in real time.

In an embodiment, the system can bring content that can be useful to formulate answers to be included in the chatbot 108. In an embodiment, a trigger released by the detect correlation module 102 can automatically initiate or run and open the curation GUI 114 for the SME 112 or the like to access, e.g., responsive to finding a correlated chatbot and trending topic in the current events or media. In another aspect, the curation GUI 114 can be run or opened manually, for example, by an SME or the like.

Figure 2:
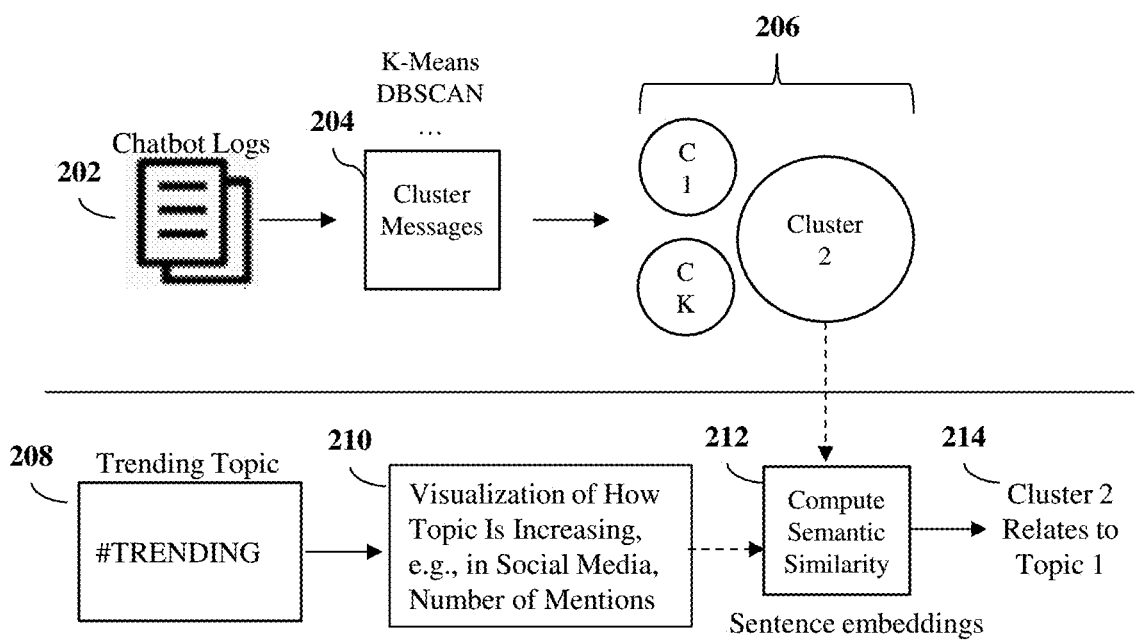
FIG. 2 is a diagram showing a detect correlation component or module in an embodiment.

FIG. 2 is a diagram showing detailed processing of a detect correlation component or module in an embodiment. The detect correlation component or module (e.g., FIG. 1 at 102) includes an automated computer process or processes or threads, run on or by one or more hardware processors. The detect correlation component or module may have multiple processes or threads, which can be run in parallel, e.g., performing a parallel processing. In an embodiment, the chatbot logs 202 can be clustered at 204 by taking into account a clustering algorithm, such as K-means and/or DBSCAN, using semantic features such as sentence embeddings. The end result of this clustering process can be a set of clusters 206 of chatbot logs. For instance, the chatbot logs can be clustered into clusters according to a common intent, e.g., theme, topic or subject matter. For instance, chatbot logs in a same cluster have the same intent.

In an embodiment, another computer process or thread may monitor the topics 208 that occur in the real world and are commented in news websites, social networks, and the like, and detects the trending topics which can be related to a specific domain. For example, a computer process may detect social media posts or feeds, news posts or feeds, and/or such other current event feeds. One or more analytical tools can be used to determine or extract trending topics from such posts, feeds and/or other content. Results of such analysis can include information 210 such as a visualization of the topics, for instance, so an SME can see which topic has higher tendency to increase. Other metrics can be shown, e.g., comparing how the topic is increasing in volume in social media, e.g., the number of mentions.

In an embodiment, a module or process 212 can compute the semantic similarity between the trending topics 208 and the clusters 206 of chatbot logs, and output the list of topics that correlate to a given cluster 214, if any. Briefly, semantic similarity may compute distance between items (e.g., trending topic and chatbot log) based on the likeness of their meaning or semantic content. In an embodiment, semantic similarity can be computed, for instance, by considering the most frequent terms or sentence embeddings. By way of example, the module or process 212 can use bag of words technique to compare the number of similar words used in chatbot logs and the analyzed current event or media content 210. As another example, the module or process 212 can use neural network based machine learning models such as Bidirectional Encoder Representations from Transformers (BERT)-based models to compute the semantic similarity. Yet as another example, the module or process 212 can use an ontology or knowledge graph to compute the semantic similarity. Another technique can be used to determine semantic similarity between the content of the chat logs and trending topics. For example, any other natural language processing and/or machine learning or artificial intelligence techniques can be used. In an aspect, a co-processor such as a graphic processing unit (GPU) can run one or more semantic similarity computation algorithms.

Figure 3:
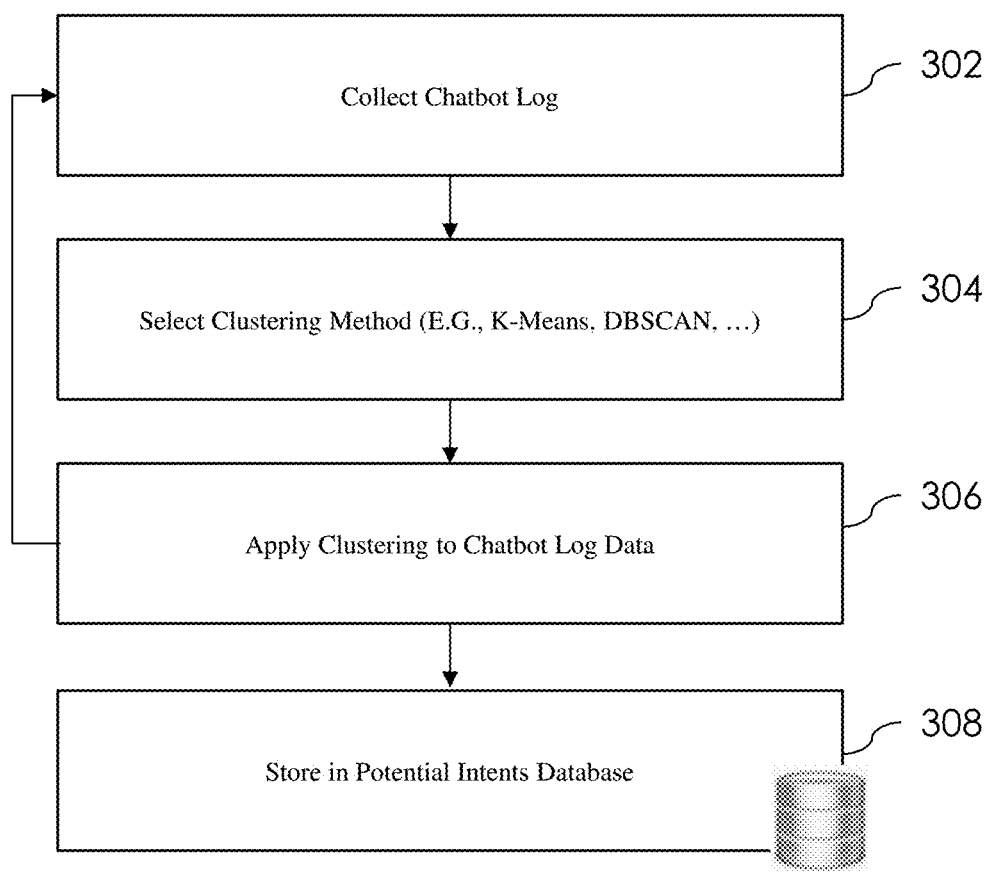
FIG. 3 is a flow diagram illustrating a process or method of clustering chatbot logs by intents in an embodiment.

FIG. 3 is a flow diagram illustrating a process or method of clustering chatbot logs by intents in an embodiment. The method can be implemented on and/or run by one or more hardware processors. For instance, the processing shown in FIG. 3 and/or FIG. 4 can be functionalities of the detect correlation module described with reference to FIG. 2. The processing shown in FIG. 3 can be performed in parallel with the processing shown in FIG. 4.

At 302, chatbot logs can be collected. The collecting of the chatbot logs can be performed in real time, for example, as a chatbot is conversing with a user. The chatbot logs collected can also include those that have been saved from previous conversations.

At 304, a clustering method or technique can be selected. In an embodiment, one or more unsupervised machine learning techniques for classification or clustering can be used or implemented. Examples include, but are not limited to, K-means and Density-based Spatial Clustering of Applications with Noise (DBScan).

At 306, the selected clustering method or technique can be applied or run on the collected chatbot logs or data. The selected clustering method clusters the chatbot logs into groups of intents. For instance, chatbot logs in the same cluster have the same or similar intent.

At 308, the clusters are stored on a storage or memory device, for example, as a database or repository of potential intents. The processing of log intent clustering can repeat as more chatbot logs are generated and/or added. For instance, the processing can iterate back to 302 to cluster additional chatbot logs. The intents database at 308 can store accumulated potential intents.

Figure 4:
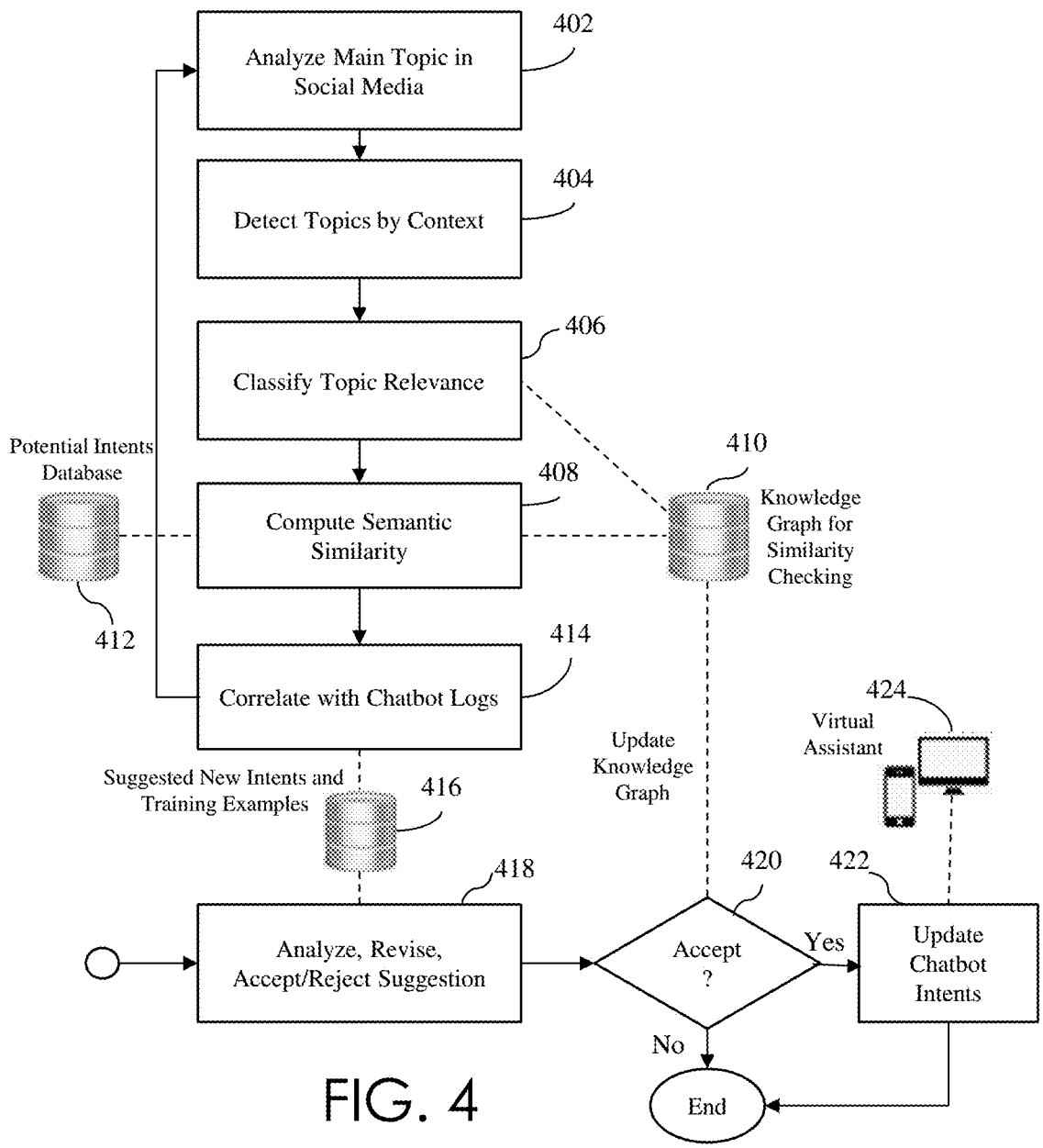
FIG. 4 is a flow diagram illustrating a process or method of finding intents in an embodiment.

FIG. 4 is a flow diagram illustrating a process or method of finding intents in an embodiment. The method can be implemented on and/or run by one or more hardware processors. The processing shown in FIG. 4 can be performed in parallel with the processing shown in FIG. 3. At 402, social media, news and/or other documents or content, for example, which may contain information about current events, can be analyzed to determine or detect trending topics. One or more known techniques can be used to extract trending topics from such social media or documents.

At 404, topics can be detected by context that are growing. The trending or growing topics need not be most important topics. For example, keywords, hashtags, mentions, and/or other tags can be tracked in available online content such as social media, news, and/or others, to detect increasingly popular or growing topics. For example, topics that are discussed increasingly more by more users, player or population, over time (e.g., a window of time) can be detected. By way of example, people may start to discuss or post about a subject on social media or the like, which topic may have a spike and then disappear shortly thereafter, e.g., a few days. On the other hand, there can be other one or more topics that people discuss or post about, which start to grow in social media and the like, and questions about such topics appear in chatbot services and grow. In an embodiment, such growth of a topic in social media, news and/or other content, can be correlated with growth of questions about the topic in chatbot logs. Known or available artificial intelligence or other tools can be employed or implemented to detect one or more trending or growing topics. Other methods can be employed.

At 406, topics can be classified by relevance. For example, relevant or similar topics may be classified into a same classification. In an aspect, a knowledge graph or database 410 can be used for topic relevance and similarity checking. The knowledge graph 410, for example, can store structured knowledge such as an ontology of related concepts. The knowledge graph 410, for example, can also include information used in determining semantic similarity such as one or more threshold values for use in determining similarity.

At 408, a potential intents database 412 may be accessed to retrieve potential intents, for example, generated by clustering the chatbot logs, for example, as described with reference to FIG. 3. Semantic similarity between the intents and the topics determined at 406 are computed. For instance, intents in chatbot logs and trending topics can be determined to be semantically similar based on meeting a threshold of similarity, for example, 90% similar, 80% similar. The threshold of similarity can be predefined or configured and can be adjustable.

At 414, the intents and the topics meeting a similarity threshold are correlated. The similarity threshold can be predefined or preconfigured. The chatbot logs from which the correlated intents are extracted are also identified. The correlated intents and associated chatbot logs can be stored as suggested new intents and training examples, for example, on a storage or memory device 416.

In an embodiment, finding of new intent, for example, intent in the chatbot logs that correlated to a trending topic, but which the chatbot did not previously cover, can automatically trigger a GUI to perform an action. For instance, the GUI or another program can be automatically run or opened to allow a developer or the like to assess the new intent. For example, at 418, a GUI can present the new intent, and allow a developer to analyze, revise, accept and/or reject the new intent that is suggested. If the developer accepts the new intent at 420, the system (e.g., a computer processor running the logic of the method shown in FIG. 4) at 422 may update the chatbot 424, to be able to handle the new intent. For instance, the chatbot 424 can be trained further based on the new intent and the associated example dialogs in the chatbot log, to be able to handle questions or messages associated with the new intent.

In an embodiment, finding of new intent can automatically update training examples or training data for training the chatbot. In response, the chatbot can be triggered to automatically retrain itself using the additional or new training data.

Figure 5:
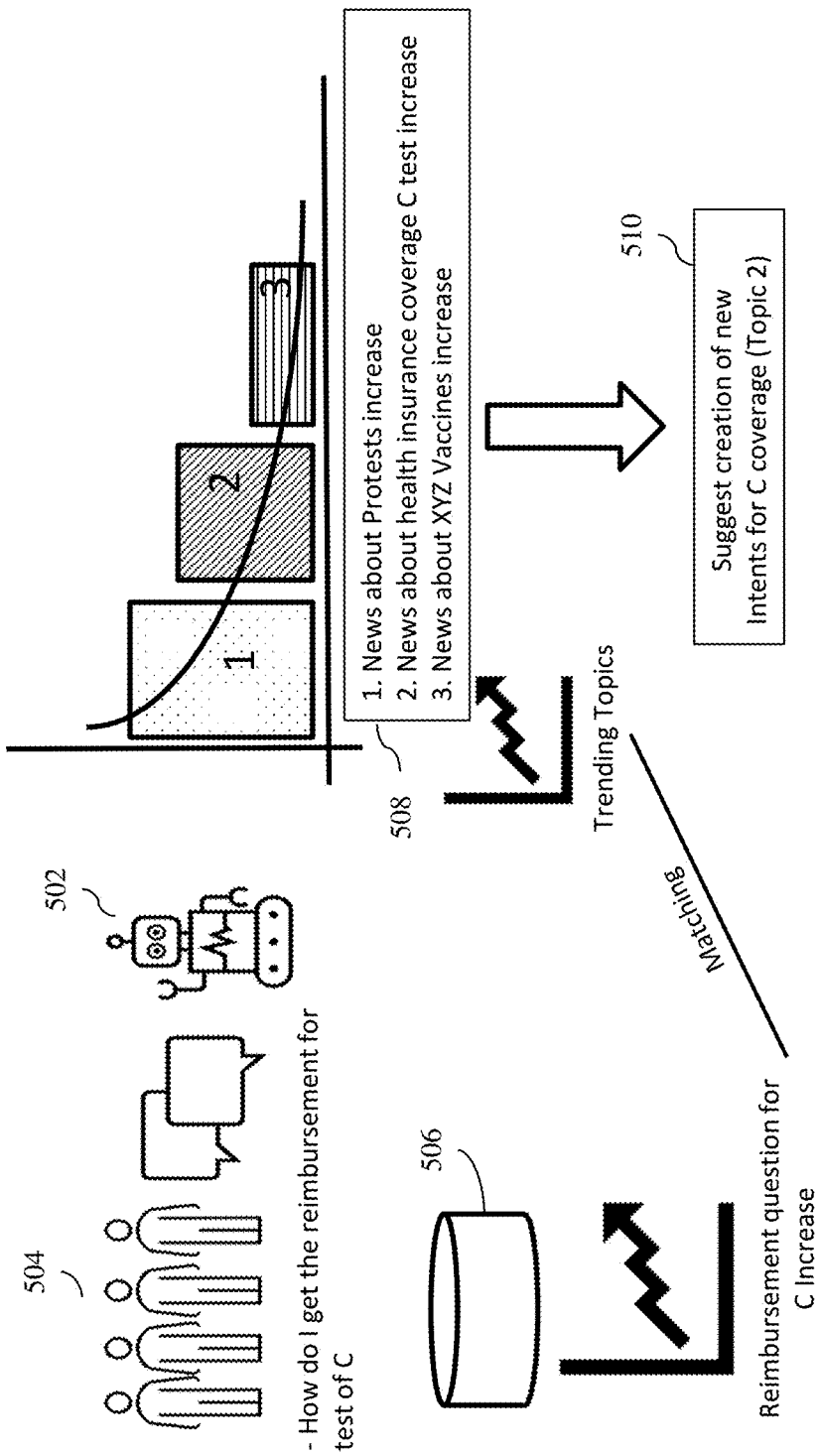
FIG. 5 is a diagram illustrating an example use case scenario in an embodiment.

FIG. 5 is a diagram illustrating an example use case scenario in an embodiment. A healthcare example is described in this use case scenario. Consider that a chatbot 502 is initially trained to converse with users and answer questions relating to medical reimbursement procedures. For instance, consider that the chatbot is trained to answer questions such as "How can I get the reimbursement for my appointment to the doctor?" In conversing with one or more users 504, the chatbot may receive questions such as "How do I get the reimbursement for test of disease C?", "How do I test for disease C?", "When can we get the new vaccine for C?" and other forms of questions that relate to new topic, e.g., disease C or health insurance coverage for testing for disease C. Such questions are logged in chatbot logs and, e.g., stored on a storage device 506. Chatbot logs can be clustered into a classification or intent cluster or classification. E.g., a cluster can be related to an intent, e.g., reimbursement questions relating to health care cost of disease C. The classified intent and the associated chatbot logs can be stored, e.g., on a storage device 506. Analysis of the chatbot logs can also uncover that such questions are increasing in number.

Social media, news, and like content can also be analyzed to uncover trending topics. For example, shown at 508, there can be different trending topics, e.g., news about certain protests increases, news about health insurance coverage of disease C tests increases, and news about a certain type of vaccine increases. Similarity between the classified intent and the trending topics can be computed. In this example, a matching or similar trending topic is identified, which matches the classified intent. For example, the intent of reimbursement questions relating to health care cost of disease C matches with or is similar to the trending topic of news about health insurance coverage for disease C tests, which is increasing. Consequently, the creation of new intent of disease C insurance coverage can be suggested as shown at 510. In an aspect, the chatbot logs having conversations associated with such questions can be used as additional training examples or data to retrain the chatbot 502.

A system in an aspect can help chatbot developers update chatbot's content, for example, by detecting chatbot log posts related to external events. The system may provide to the developer which questions, extracted from the chatbot, are related to a given event. After a trigger or by a manual inspection, the developer may decide whether to include an automatically created new intent, and which messages can be used as training examples. The system may also bring compilations of texts that can be useful to create answering content. The system may accelerate the process of curating and updating chatbot content, by proposing new intents based on chatbot logs and external events. The system can detect questions that become more common to be asked by the users, which are likely to migrate from the long tail of the distribution to the core of the chatbot's content. The system may predict potential questions that could migrate from the probability distribution tail to the area of high density. Automatic creation of chatbot intents by using the combination of media trending topics and aggregated questions from user interaction logs can speed up the process considerably and also bring external knowledge that may not be obvious in developing chatbots or chatbot applications.

Figure 6:
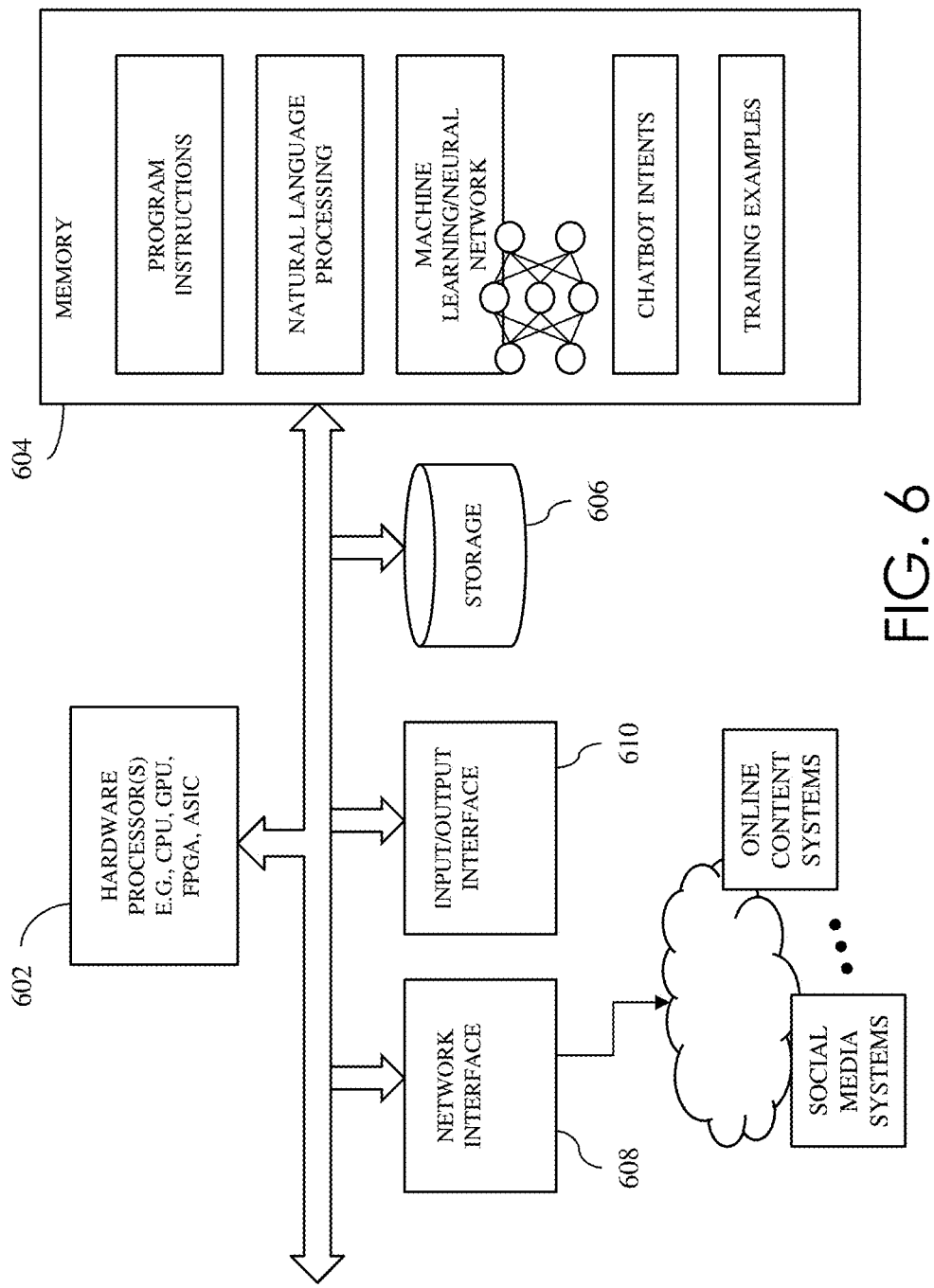
FIG. 6 is a diagram showing components of a system in one embodiment that may incorporate into conversational systems such as chatbot applications, intent related to external or current trending events.

FIG. 6 is a diagram showing components of a system in one embodiment that may incorporate into conversational systems such as chatbot applications, content related to external or current trending events. One or more hardware processors 602 such as a central processing unit (CPU), a graphic process unit (GPU), and/or a Field Programmable Gate Array (FPGA), an application specific integrated circuit (ASIC), and/or another processor, may be coupled with a memory device 604, and uncover and/or suggest one or more new intents for training a chatbot based on trending topics identified in social media or other content outside or external to the conversation system. For instance, identified or uncovered new intent can be added to training data for training or retraining a chatbot to be able to handle conversations or questions relating to the new intent. A memory device 604 may include random access memory (RAM), read-only memory (ROM) or another memory device, and may store data and/or processor instructions for implementing various functionalities associated with the methods and/or systems described herein. One or more processors 602 may execute computer instructions stored in memory 604 or received from another computer device or medium. A memory device 604 may, for example, store instructions and/or data for functioning of one or more hardware processors 602, and may include an operating system and other program of instructions and/or data. One or more hardware processors 602 may receive input, which can include chatbot log data. Input can also include social media posts, content, news posts, and/or another current events documents or content. For example, at least one hardware processor 602 may receive chatbot logs including at least questions received by a chatbot conversing with a user. At least one hardware processor 602 may cluster the chatbot logs into clusters of potential intents. At least one hardware processor 602 may detect trending topics by analyzing at least social media content. At least one hardware processor 602 may compute semantic similarities between the potential intents and the trending topics. At least one hardware processor 602 may, based on the computed semantic similarities, correlate at least one of the potential intents to at least one of the trending topics. At least one hardware processor 602 may trigger training of the chatbot using the chatbot logs associated with the correlated potential intent. In one aspect, chatbot logs may be stored on a storage device 606 or received via a network interface 608 from a remote device, and may be temporarily loaded into a memory device 604 for uncovering and/or creating new intents for chatbot training. One or more hardware processors 602 may be coupled with interface devices such as a network interface 608 for communicating with remote systems, for example, via a network, and an input/output interface 610 for communicating with input and/or output devices such as a keyboard, mouse, display, and/or others. One or more hardware processors 602, in an embodiment, can monitor topics that occur in the real world and commented on in news websites, social networks, and the like, to detect the trending topics which can be related to a specific domain. One or more hardware processors 602 can compute semantic similarity between the trending topics and the clusters of chatbot logs. In an embodiment, the semantic similarity can be computed by considering the most frequent terms and/or sentence embeddings.

Figure 7:
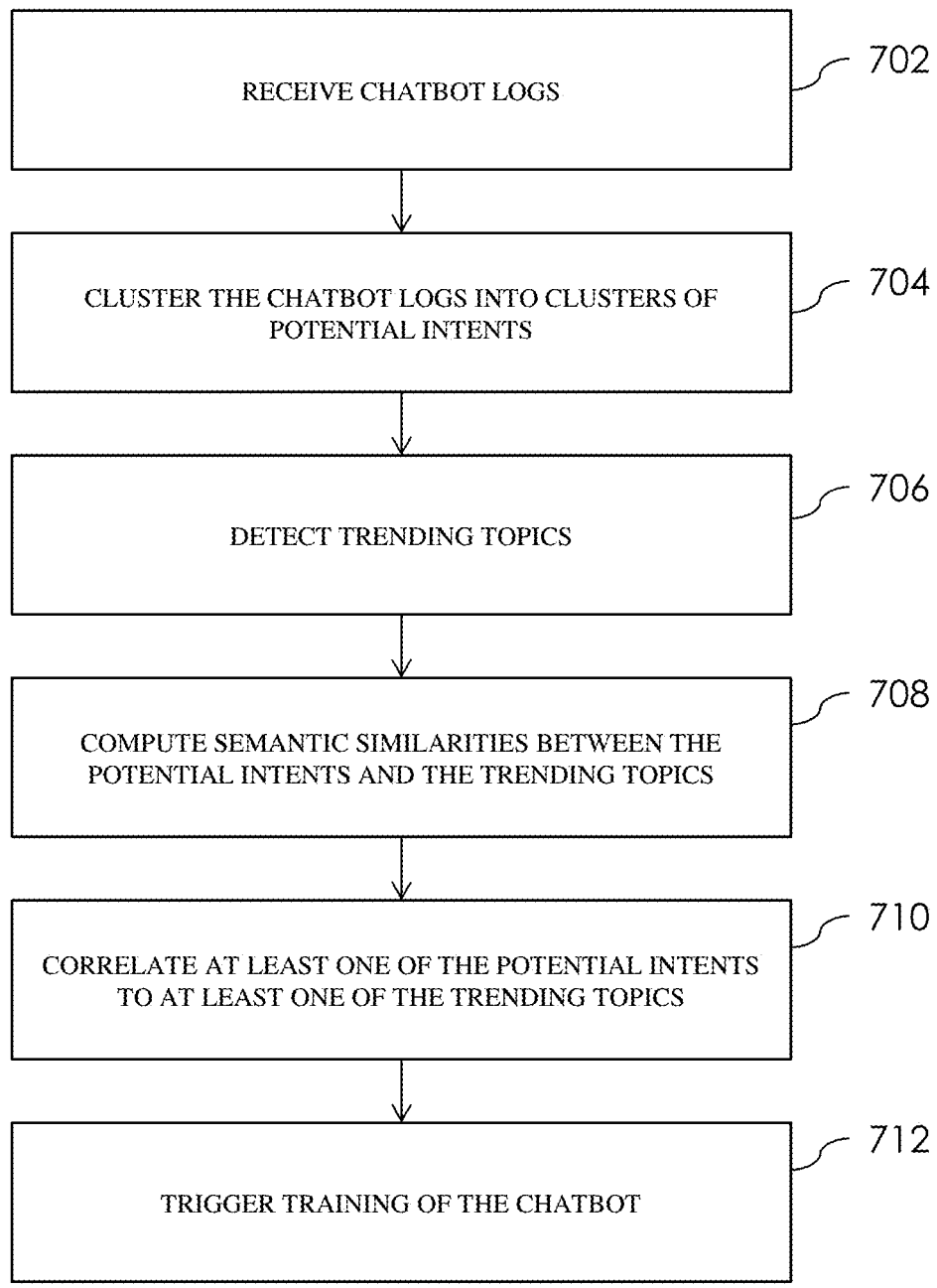
FIG. 7 is a flow diagram illustrating a method of finding new intents for training a chatbot in an embodiment.

FIG. 7 is a flow diagram illustrating a method of finding new intents for training a chatbot in an embodiment. The method can be implemented on or run by one or more hardware processors. At 702, chatbot logs including at least questions received by a chatbot conversing with a user can be received. In an embodiment, the chatbot logs can be received in real time as the chatbot's conversation with the user is being logged.

At 704, the chatbot logs can be clustered into clusters of potential intents. In an embodiment, unsupervised machine learning algorithm can be invoked to cluster the chatbot logs into clusters of potential intents. At 706, trending topics can be detected by analyzing at least social media content. In an embodiment, invoking unsupervised machine learning to cluster the chatbot logs into clusters of potential intents and detecting trending topics by analyzing at least social media content in parallel, can be performed in parallel.

At 708, semantic similarities between the potential intents and the trending topics can be computed.

At 710, based on the computed semantic similarities, at least one of the potential intents can be correlated to at least one of the trending topics.

At 712, training of the chatbot using the chatbot logs associated with the correlated potential intent can be triggered. In an embodiment, training data used to train the chatbot can be automatically updated with the correlated potential intent. In an embodiment, triggering the training of the chatbot can be performed automatically. In another embodiment, triggering the training of the chatbot can include prompting via a graphical user interface to add the correlated potential intent to training data for training the chatbot, and in response to receiving a confirmation to add or accept the new intent (the correlated potential intent), the method can further include adding the potential intent to the training data of the chatbot and retraining or updating the chatbot. A developer or the like can also be allowed via the graphical user interface to select which messages in the chatbot logs can be used as training examples. The retraining can be done automatically or responsive to receiving a confirmation from a developer or the like.

In an embodiment, the processing shown in FIG. 7 can be performed continually or iteratively, for example, as the chatbot logs are updated continuously, for example, so as to be able to process the chatbot logs that are up-to-date.

In an embodiment, a method may uncover the interaction logs of multiple users with a chatbot and, responsive to identifying a trend, e.g., which is not ephemeral both in the chatbot interaction logs and in trending topics in social media and news sites or other external content, suggest new intents to one or more subject matter experts. The method may detect questions that become more common to be asked by the users, which are likely to migrate from the long tail of the distribution to the core of the chatbot's content. The method can improve the process of curating chatbots contents. In an aspect, the method can help chatbot developers update chatbot's content, e.g., by detecting chatbot logs related to external events that are likely to become trending. The method can accelerate the process of curating and updating chatbot content, by proposing new intents based on chatbot logs and external events. For instance, in an embodiment, the method can improve specifically an intent recognition module, which can be a core of a chatbot, in a more automated fashion. The method in an embodiment can provide a developer or the like in an automated manner, information of possible new intents and the corresponding sets of examples to create intents, e.g., based on linking chatbot logs with data from external sources. The method can also bring knowledge which a developer or the like might not be aware of, e.g., by uncovering new intents from the linkage of chatbot log clusters of questions with external trend topics.

Figure 8:
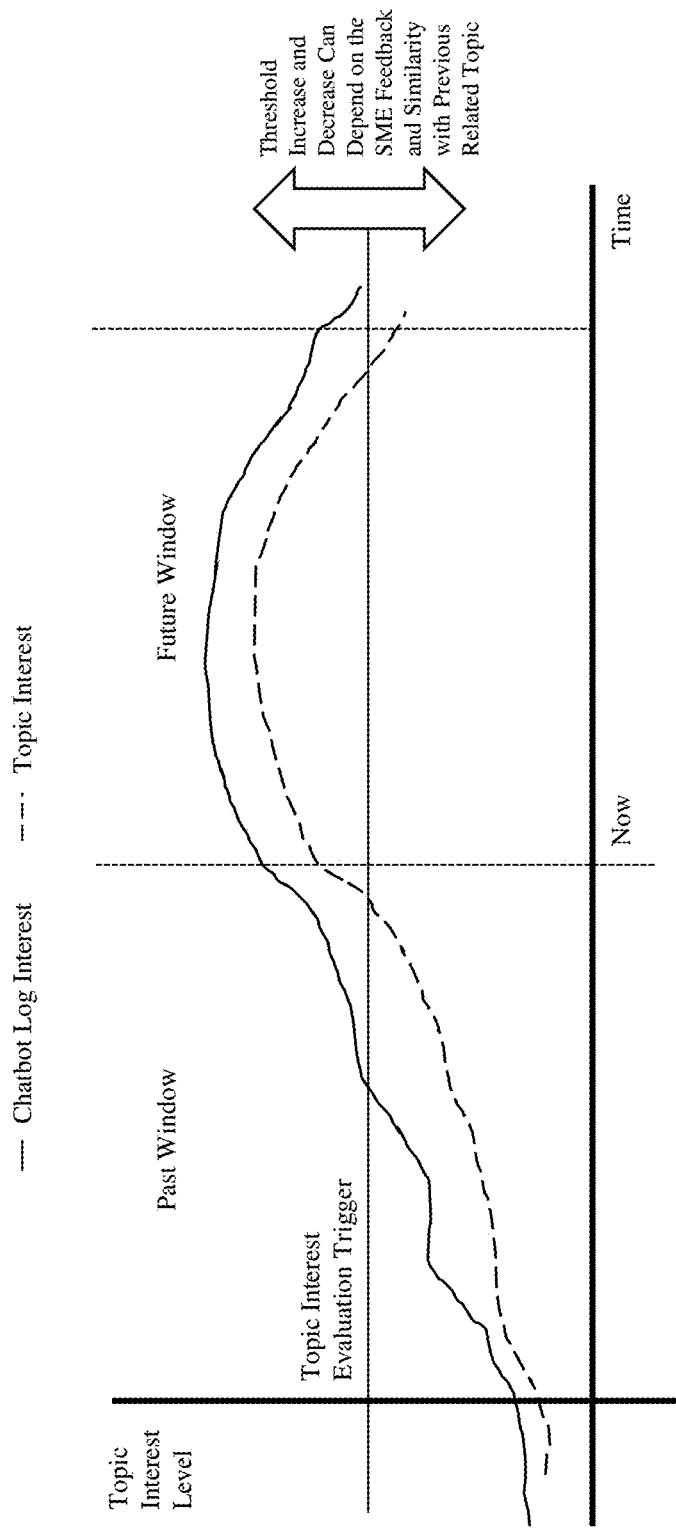
FIG. 8 is a diagram illustrating a graph plotting interests appearing in chatbot logs and external content over time windows in an embodiment.

In an embodiment, a system and/or method can also detect the conditions to consider a topic to be ephemeral or not. FIG. 8 is a diagram illustrating a graph plotting interests appearing in chatbot logs and external content over time windows in an embodiment. The solid line on the graph represents chatbot log interest and the dotted lined represents a trending topic interest uncovered in external content such as social media, news, and/or others.

While there can be many topics that are subjects of discussion, not all topics are lasting, for example, they can be ephemeral, lasting only for a very short time. In an embodiment, in creating one or more new intents, there may be some delay between the appearance of a new topic, and the triggering of the creation of a new intent.

In an embodiment, the system and/or method may consider a configurable sliding window ("Past Window" shown in FIG. 8) that inspects the past when detecting new intents. Each time a new trending topic is detected, the system and/or method may observe the growth of that topic within the window. If the volume lowers abruptly in the window (e.g., drops by more than a threshold value which can be configured), the system and/or method can consider this topic is ephemeral and, therefore, drop it from the list of potential new intents. Otherwise, this topic can potentially be considered. The system and/or method may also use the sliding window to analyze the persistence of new topics in the call logs. The system and/or method can use a knowledge graph to identify the topic context, and a historical database to predict whether or not this topic tends to persist over time. If the topic is predicted to tend to persist and the topic interest also increases in the chatbot log, the system and/or method may signal the creation of the new intent.

In another embodiment, a method for forecasting the lifecycle of trending topics as they emerge can be used. Such a method can work as follows: as new topics emerge, the predictive model forecasts how the topic will evolve in social media (e.g., Future Window in FIG. 8). Similarly, a search in the chatbot logs can be performed to identify the prevalence of the same topic in the chatbot logs. If the topic is identified, the predictive model can be used to predict how the topic will evolve in the chatbot logs. If the forecast indicates the topic will trend in both social media or like (external content) and in chatbot logs, then a new intent can be created for that new topic. In this embodiment also, a knowledge graph can be used to identify similar documents or content that share that topic, and a historical database can be used to check the persistence of the topic. Yet in another embodiment, a system and/or method may include a hybrid method that looks both into the past (e.g., Past Window) and into the future (e.g., Future Window) for predicting new intents.

In one or more embodiments, a threshold (topic interest evaluation trigger) that determines whether a topic will become an intent or not can be used as a cut-off value. In an embodiment, this value can be set manually by the SME. In another embodiment, this value can be automatically optimized based on the acceptance rate of proposed intents validated by the SME. For instance, the shape of the frequency curve of the topics related to new intents, and stored in the knowledge graph, can be analyzed. The system and/or method can then evaluate the integral of the topic interest level along the time and calculate the total amount of relevance of this topic. Then, the system and/or method can find the time in which the topic reaches a given amount of relevance for this topic (for instance 10% of the area under the curve) to estimate the topic interest default level. That time can then be adaptively adjusted in accordance with the proposed intents that are accepted and/or rejected by the SME.

Figure 9:
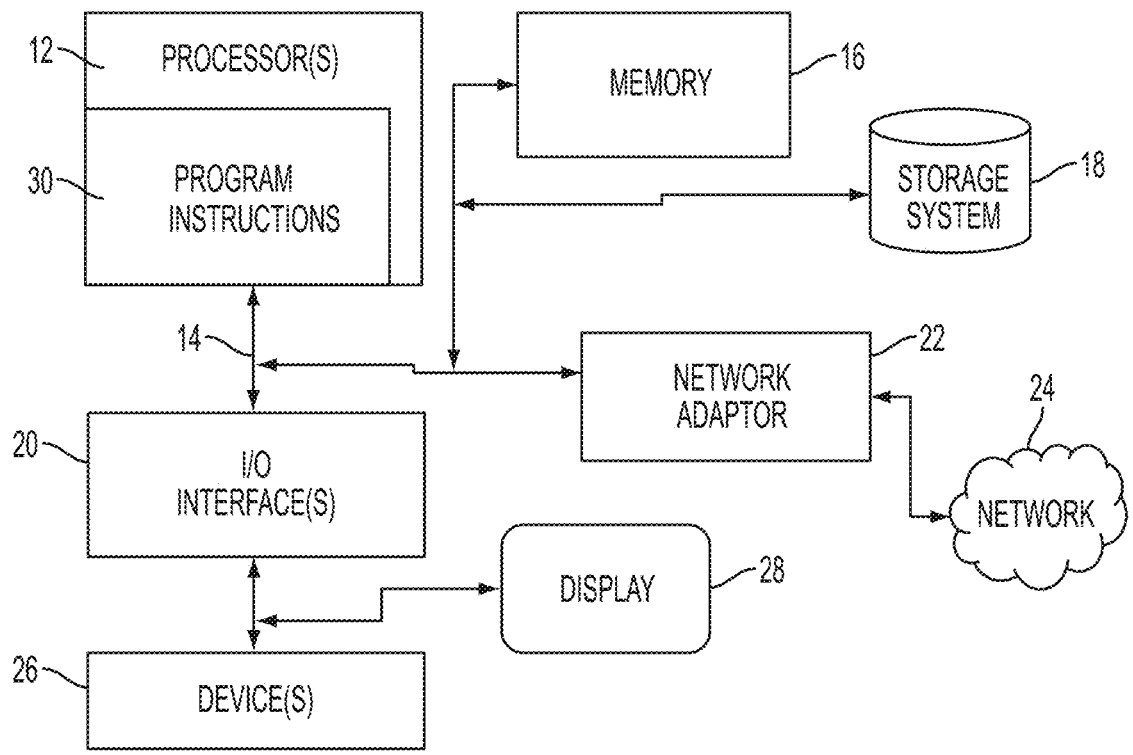
FIG. 9 illustrates a schematic of an example computer or processing system that may implement a system in one embodiment.

FIG. 9 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 9 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
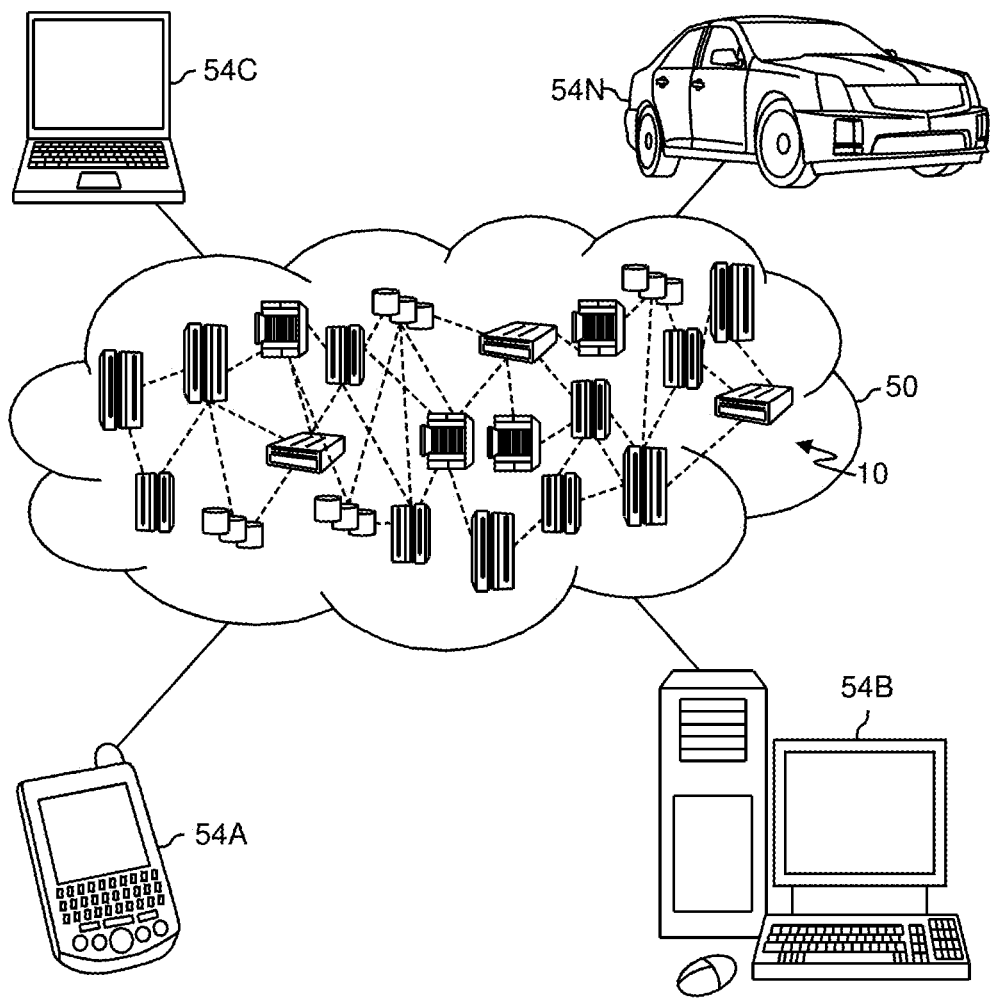
FIG. 10 illustrates a cloud computing environment in one embodiment.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
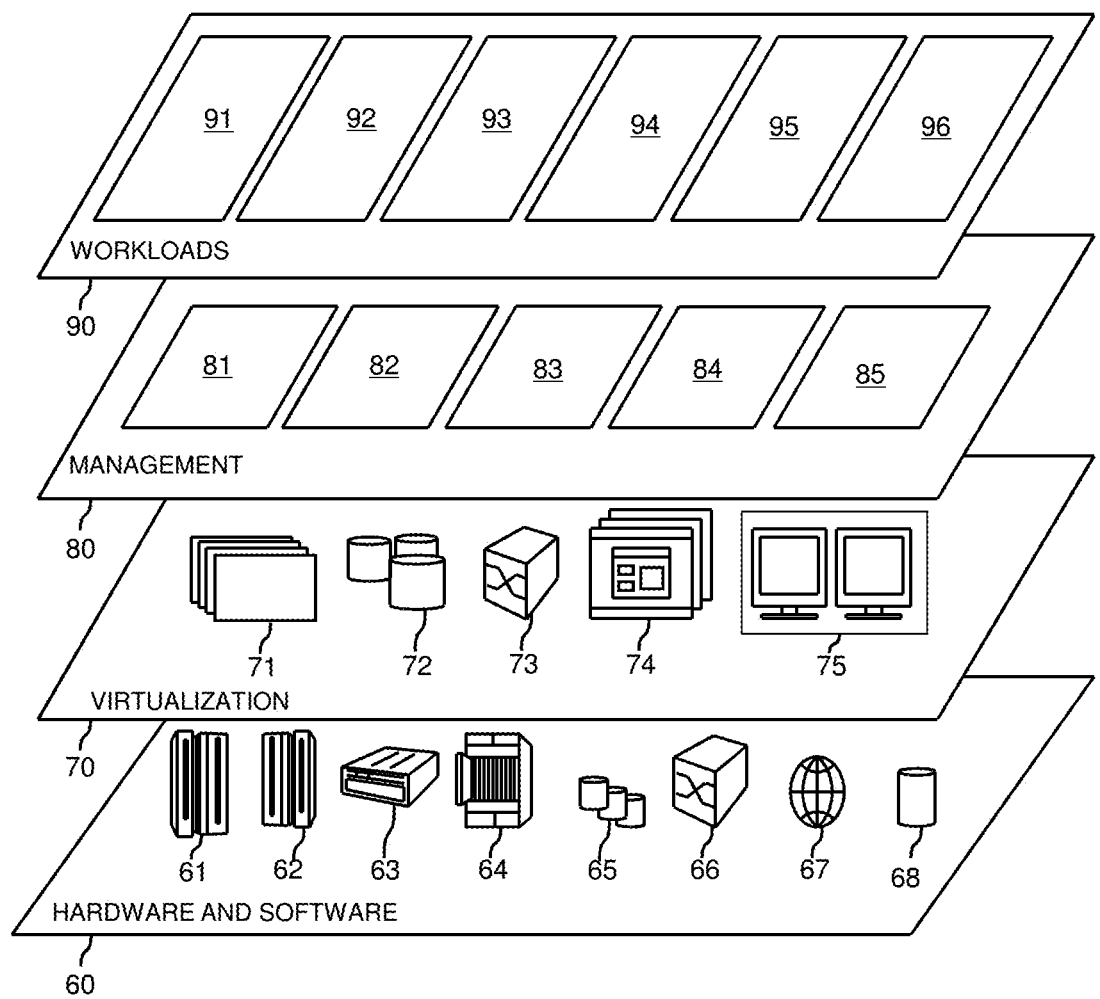
FIG. 11 illustrates a set of functional abstraction layers provided by cloud computing environment in one embodiment of the present disclosure.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and chatbot intents processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
    a hardware processor;
    a memory device coupled with the hardware processor;
    the hardware processor configured to at least:
        receive chatbot logs including at least questions received by a chatbot conversing with a user;
        cluster the chatbot logs into clusters of potential intents;
        detect trending topics by analyzing at least social media content;
        compute semantic similarities between the potential intents identified with the clusters, and the trending topics;
        based on the computed semantic similarities, correlate at least one of the potential intents identified with at least one of the clusters to at least one of the trending topics; and
        trigger training of the chatbot using the chatbot logs associated with the correlated potential intent identified with at least one of the clusters.

2. The system of claim 1, wherein the hardware processor is configured to receive the chatbot logs in real time as the chatbot's conversation with the user is logged in real time.

3. The system of claim 1, wherein the hardware processor is configured to automatically update training data used to train the chatbot with the correlated potential intent.

4. The system of claim 1, wherein the hardware processor is configured to trigger the training of the chatbot automatically.

5. The system of claim 1, wherein the hardware processor is configured to trigger the training of the chatbot by providing a prompt via a graphical user interface to add the correlated potential intent to training data for training the chatbot.

6. The system of claim 1, wherein the hardware processor is configured to invoke unsupervised machine learning to cluster the chatbot logs into clusters of potential intents and detect trending topics by analyzing at least social media content in parallel.

7. A computer-implemented method comprising:
    receiving chatbot logs including at least questions received by a chatbot conversing with a user;
    clustering the chatbot logs into clusters of potential intents;
    detecting trending topics by analyzing at least social media content;
    computing semantic similarities between the potential intents identified with the clusters, and the trending topics;
    based on the computed semantic similarities, correlating at least one of the potential intents identified with at least one of the clusters to at least one of the trending topics; and
    triggering training of the chatbot using the chatbot logs associated with the correlated potential intent identified with at least one of the clusters.

8. The method of claim 7, wherein the chatbot logs are received in real time as the chatbot's conversation with the user is logged in real time.

9. The method of claim 7, further including automatically updating training data used to train the chatbot with the correlated potential intent.

10. The method of claim 7, wherein the triggering training of the chatbot is performed automatically.

11. The method of claim 7, wherein the triggering training of the chatbot includes providing a prompt via a graphical user interface to add the correlated potential intent to training data for training the chatbot.

12. The method of claim 7, wherein said invoking unsupervised machine learning to cluster the chatbot logs into clusters of potential intents and said detecting trending topics by analyzing at least social media content, are performed in parallel.

13. A computer program product comprising a computer readable storage medium having program instructions embodied therewith, the program instructions readable by a device to cause the device to:
    receive chatbot logs including at least questions received by a chatbot conversing with a user;
    cluster the chatbot logs into clusters of potential intents;
    detect trending topics by analyzing at least social media content;
    compute semantic similarities between the potential intents identified with the clusters, and the trending topics;
    based on the computed semantic similarities, correlate at least one of the potential intents identified with at least one of the clusters to at least one of the trending topics; and
    trigger training of the chatbot using the chatbot logs associated with the correlated potential intent identified with at least one of the clusters.

14. The computer program product of claim 13, wherein the device is caused to receive the chatbot logs in real time as the chatbot's conversation with the user is logged in real time.

15. The computer program product of claim 13, wherein the device is caused to automatically update training data used to train the chatbot with the correlated potential intent.

16. The computer program product of claim 13, wherein the device is caused to trigger the training of the chatbot automatically.

17. The computer program product of claim 13, wherein the device is caused to trigger the training of the chatbot by providing a prompt via a graphical user interface to add the correlated potential intent to training data for training the chatbot.

18. The computer program product of claim 13, wherein the device is caused to invoke unsupervised machine learning to cluster the chatbot logs into clusters of potential intents and detect trending topics by analyzing at least social media content in parallel.

\* \* \* \* \*